2,287,136

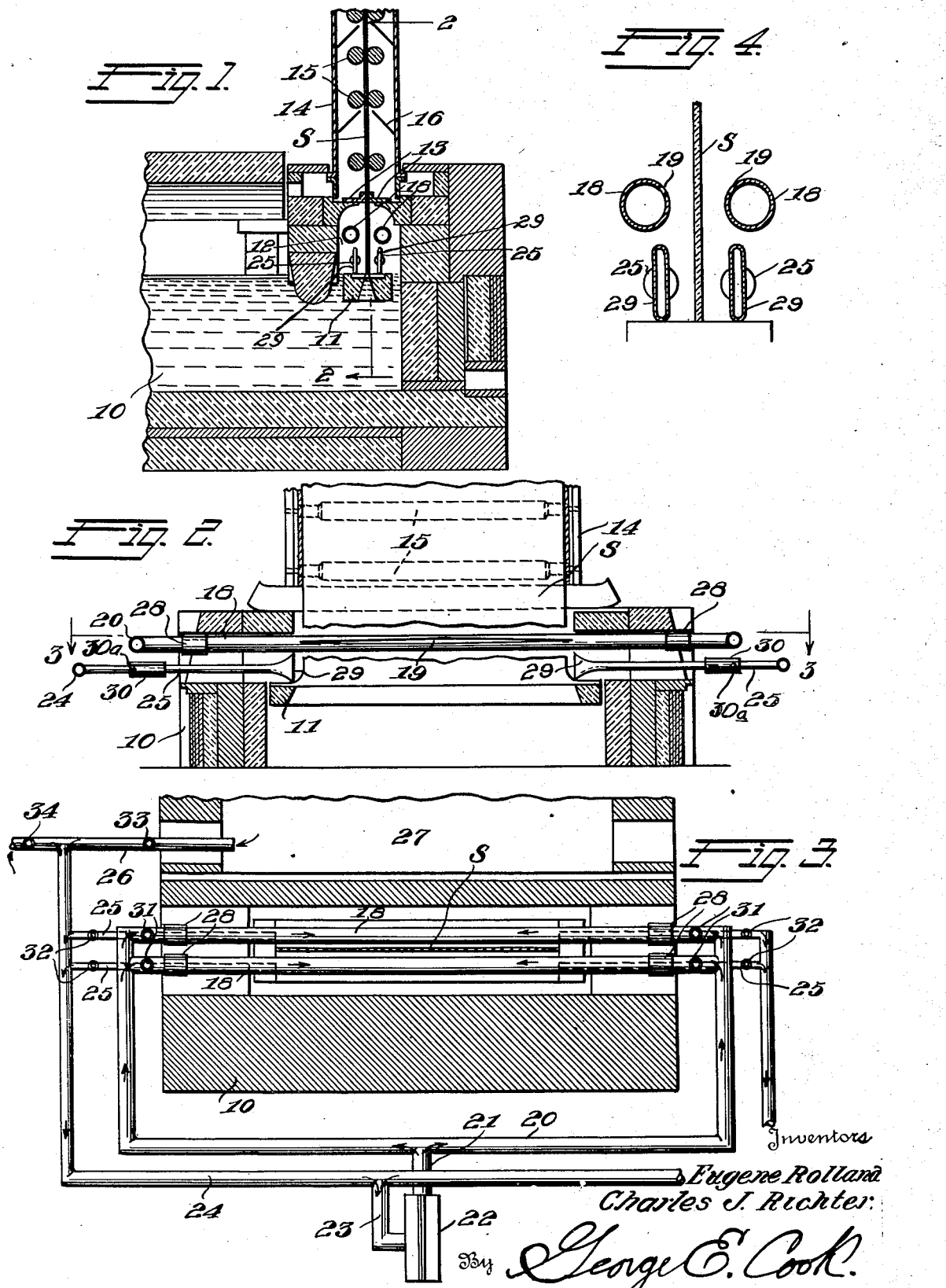
June 23, 1942.   E. ROLLAND ET AL   2,287,136
MANUFACTURE OF SHEET GLASS
Filed July 17, 1939
Inventors
Eugene Rolland
Charles J. Richter
By George E. Cook
Attorney Patented June 23, 1942

UNITED STATES PATENT OFFICE 2,287,136

MANUFACTURE OF SHEET GLASS

Eugene Rolland and Charles J. Richter, Clarksburg, W. Va., assignors of one-half to Adamston Flat Glass Company, and one-half to Rolland Glass Company, both of Clarksburg, W. Va., corporations of West Virginia Application July 17, 1939, Serial No. 284,973

9 Claims. (Cl. 49—17)

This invention relates to the manufacture of sheet glass.

The invention is particularly concerned with a method of and apparatus for manufacturing sheet glass whereby better annealing is obtained and the characteristic wave of drawn glass is substantially eliminated.

In the Fourcault process of manufacturing sheet glass, the sheet is drawn upwardly from a bath of molten glass through a slot in a debiteuse. It is then passed between coolers within a stretching and setting chamber and is then carried upwardly through a vertically extending lehr adjacent to the top of which the continuously rising glass sheet is scored and cut into desired lengths.

The zones through which the sheet successively passes are in atmospheric communication and the heat given off by the cooling of the glass in the stretching and setting zone produces uncontrolled currents of lighter air which flow from this zone in the direction of travel of the sheet, and consequently, currents of colder air are drawn into this zone, thereby causing a certain turbulence in the atmospheric conditions in the stretching and setting zone, which results in non-uniform cooling of the glass. The glass, therefore, does not stretch evenly and the characteristic wavy surfaces are produced.

This objection has been recognized for a long period of time, and various attempts have been made to overcome same, as by maintaining a sufficiently high air pressure within the stretching and setting zone to preclude currents of colder air being drawn thereinto. However, in the methods heretofore proposed, the air pressure was not stable in the direction of the width of the sheet of glass within the stretching and setting zone, and consequently, a certain air turbulence still prevailed with the result that the objectionable wavy surface to a certain degree was still present on the sheets of drawn glass.

It is accordingly a primary object of this invention to provide a method of and apparatus for drawing sheet glass whereby better annealing thereof is obtained and the characteristic surface waves are substantially eliminated.

It is a further object of the invention to provide a method of and apparatus for drawing sheet glass whereby a substantially stable air pressure is maintained within the stretching and setting zone so as to avoid induced air currents, thereby providing for uniform stretching of the glass within such zone.

With these objects in view together with others which will present themselves in the course of the following disclosure, reference will be had to the accompanying drawing forming part of same and wherein:

Fig. 1 is a vertical sectional view through the glass-melting tank, stretching and setting chamber, and the lehr of a common form of glass-drawing apparatus, disclosing the application of the present invention in a preferred embodiment thereof;

Fig. 2 is a vertical sectional view in a plane substantially as indicated by the line 2—2 in Fig. 1;

Fig. 3 is a horizontal sectional view in a plane substantially as represented by the line 3—3 in Fig. 2; and Fig. 4 is an enlarged fragmentary vertical section showing the relation of the air-conducting conduits to the sheet of glass being drawn.

Referring now to the drawing by reference characters, and wherein like characters designate like parts in the several views, 10 designates a glass-melting tank and 11 designates a slotted debiteuse block, which is disposed at the base of the stretching and setting chamber 12. The top of such chamber is formed by overhanging portions of the tank together with a pair of angle members 13, the vertical portions of which are so spaced from each other as to permit passage of the glass sheet S upwardly from the molten glass in the tank and through the lehr 14 superposed upon the chamber 12.

As in usual practice, the lehr is provided with rollers 15 and louvers 16, suitable air openings being provided in the walls of the lehr adjacent the louvers 16.

According to the present invention, means are provided for maintaining a stabilized air pressure within the stretching and setting chamber 12 to prevent induced air currents entering from the surrounding atmosphere and of such temperature as to provide for maximum efficiency in the stretching and setting of the glass.

In a preferred embodiment thereof, such means comprise a pair of air conduits 18, each of which is provided with a slot 19, which, as indicated in Fig. 2, is preferably tapered from maximum width, adjacent its center toward the opposite ends thereof.

The conduits 18 at opposite ends thereof communicate with the ends of the angular conduit 20, which, through the connection 21, is in communication with the outlet of an air blower 22.

The inlet of the blower 22 is in communication through a connection 23 with an angular air conduit 24, which, adjacent the opposite ends thereof, is in communication with air conduits 25 disposed below and in parallelism with the conduits 18.

One branch of the angular conduit 24 communicates with a two-way conduit 26, one end of which communicates with a suitably heated air chamber 27 and the other end of which is in communication with atmosphere.

The conduits 18 preferably include suitable swivel connections 28 adapting the slotted portions thereof for rotatable adjustment about their axes for altering the positions of the slots 19 relative to the opposed faces of the glass sheet S.

The conduits 25 each terminate in a flattened free end 29 and such conduits each preferably include a telescopic connection 30 and a horizontal pivotal connection 30ᵃ adapting the flattened end portions for adjustment in vertical planes for altering the relation of the slots in the flattened ends to the slots 19 in the conduits 18.

The conduits 18 are each provided adjacent each end thereof with a gate or valve 31, the conduits 25 each being provided with a gate or valve 32 and the conduit 26 being provided with a gate or valve 33 between the conduit 24 and heated air chamber 27 and with a gate or valve 34 between the conduit 24 and its atmosphere communicating end.

It is to be noted that with this improved arrangement of air conduits, the customary water coolers are omitted and the method of setting the sheet of glass, which is more clearly indicated in Fig. 3, is as follows:

Air is continuously drawn by the blower 22, through the conduit 24, as well as the conduits 25 and 26, and thus the air admitted to the blower is obtained from the stretching and setting chamber 12 with which the flattened ends of the conduits 25 communicate, as well as from the air heating chamber 27, and the atmosphere providing that the valves 32, 33, and 34 are all open.

The air thus drawn into the blower 22 is forced through the conduit 20, into the conduits 18, and against the opposite faces of the glass sheet S through the slots 19, which are of a length at least equal to the width of the glass sheet being drawn.

By rotating the conduits 18 about their axes, the slots 19 may be positioned to direct the film of air against opposite faces of the glass sheet at the most efficient angle, and by adjusting the conduits 25 horizontally or pivotally, or both in vertical planes, the air at the most effective points within the chamber 12 may be withdrawn by the blower 22.

With this arrangement of adjustable air conduits and by the provision of the valves 31, 32, 33, and 34, the pressure and the temperature of the air within the stretching and setting chamber 12 can be critically adjusted for maximum glass-setting efficiency, and by the provision of the horizontal slots 19 in the conduits 18 and the elongated slots in the flattened ends of the conduits 25, proper air pressure is maintained within the chamber 12 in the absence of induced air currents and a resulting turbulence, whereby the glass sheet is properly stretched, set, and annealed with a substantial elimination of the characteristic surface wave. It may be found desirable in certain instances to utilize small water coolers in order to accelerate the setting of the glass sheet.

While it is preferred to carry out the method as above disclosed, satisfactory results may be obtained by reversing the procedure as illustrated, which may be readily carried out by means of suitable by-passes in the blower 22.

By suitable manipulation of the valves 31 and 32, the volume of air introduced may be readily varied with respect to the volume withdrawn and by suitable manipulation of the valves 33 and 34, the temperature of the air admitted to the chamber 12 may readily be varied.

From the above detailed disclosure, it should readily be appreciated that the present invention provides a method and apparatus in the manufacture of sheet glass, whereby proper air conditions are maintained within the stretching and setting zone for maximum efficiency in drawing of the sheet of glass with better annealing and a substantial elimination of the characteristic surface wave.

While we have disclosed but a single specific embodiment of our invention, such is to be considered as illustrative only, and not restrictive, the scope of the invention being defined in the subjoined claims.

What we claim as new and desire to secure by U. S. Letters Patent is:

1. In sheet glass drawing apparatus comprising a glass-melting tank, a stretching and setting chamber communicating with the tank, an annealing lehr disposed above the chamber, and means for continuously drawing a glass sheet upwardly from the tank and successively through the chamber and lehr; the improvement comprising a pair of parallel slotted air conduits extending through the chamber adjacent to and parallel with opposed faces of a glass sheet being drawn, a pair of parallel air conduits extending into the chamber from each opposite side thereof and terminating adjacent the opposite edges of the sheet substantially below the first-named conduits, and a blower in communication with all of the conduits and operative to draw air from the chamber through the last-mentioned conduits and exhaust air into the chamber through the first-mentioned conduits.

2. The structure defined in claim 1 wherein the first conduits include swivel connections providing for rotatable adjustment thereof about their axes and the second conduits include combined telescopic and pivotal connections for adjustment thereof in vertical planes.

3. The structure defined in claim 1 together with a conduit in communication with the last-named conduits, with a source of heated air and with the atmosphere.

4. In sheet glass drawing apparatus comprising a glass-melting tank, a stretching and setting chamber communicating with the tank, an annealing lehr disposed above the chamber, and means for continuously drawing a glass sheet upwardly from the tank and successively through the chamber and lehr; the improvement comprising a pair of parallel slotted air conduits extending through the chamber adjacent to and parallel with opposed faces of a glass sheet being drawn, a pair of parallel air conduits extending into the chamber from each opposite side thereof, the conduits of each pair being disposed at opposite sides of the glass sheet and terminating adjacent the opposite edges thereof, an air-heating chamber, a blower, conduit connections between the inlet of the blower, the second-named pairs of conduits, the air-heating chamber and atmosphere, and conduit connections between the outlet of the blower and the first-named conduits.

5. In a method of treating a glass sheet while being continuously drawn upwardly from a bath of molten glass and through a stretching and setting chamber having a debiteuse block at the base thereof; the steps consisting in withdrawing air from the chamber adjacent the debiteuse block at spaced points at each side of the sheet and adjacent the vertical edges thereof, and simultaneously directing the withdrawn air together with a further volume of air of predetermined temperature against the opposite surfaces of the glass sheet from one edge thereof to the other and at a position substantially above the points from which the air is withdrawn.

6. In a method of treating a glass sheet while being continuously drawn upwardly from a bath of molten glass and through a stretching and setting chamber having a debiteuse block at the base thereof; the steps consisting in withdrawing air from the chamber adjacent the debiteuse block at spaced points at each side of the sheet and adjacent the vertical edges thereof; and simultaneously directing the withdrawn air together with a further volume of atmospheric and pre-heated air against the opposite surfaces of the glass sheet at positions substantially above the points from which the air is withdrawn, the air being directed against the glass sheet in film formation from edge to edge of the sheet and at an angle to the surfaces thereof.

7. In sheet glass drawing apparatus comprising a melting tank, a stretching and setting chamber having a debiteuse block at the base thereof, a lehr supported above the chamber, and means for continuously drawing a sheet of glass upwardly from the tank and successively through the chamber and lehr; the improvement comprising a pair of laterally spaced conduits in the chamber substantially above the debiteuse block, the conduits having slots in their walls axially thereof for directing sheets of air against opposite faces of a glass sheet passing therebetween, other open ended conduits projecting into the chamber adjacent the debiteuse block and in laterally spaced relation for passage of a glass sheet therebetween, and means for continuously drawing air from the chamber through the last-named conduits and forcing it into the first-named conduits for impingement in sheet formation against opposite faces of the glass sheet.

8. The structure defined in claim 7, wherein the second-named conduits have their open ends vertically flattened and wherein they include telescopic and pivotal connections for adjustment thereof in vertical planes.

9. The structure defined in claim 4 together with valves in said conduits and conduit connections for critical adjustment of the pressure and temperature of the air within the stretching and setting chamber.

EUGENE ROLLAND.
CHARLES J. RICHTER.